United States Patent
Seo

(10) Patent No.: US 9,400,899 B2
(45) Date of Patent: Jul. 26, 2016

(54) SOCKET FOR CARD

(71) Applicant: Samsung Electronics Co., Ltd., Suwon-si, Gyeonggi-do (KR)

(72) Inventor: Jeong-Seok Seo, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 158 days.

(21) Appl. No.: 14/161,194

(22) Filed: Jan. 22, 2014

(65) Prior Publication Data

US 2014/0349512 A1  Nov. 27, 2014

(30) Foreign Application Priority Data

May 23, 2013  (KR) .................... 10-2013-0058483

(51) Int. Cl.
*H01R 13/64* (2006.01)
*G06K 7/00* (2006.01)
*H01R 12/50* (2011.01)

(52) U.S. Cl.
CPC ............ *G06K 7/0056* (2013.01); *G06K 7/0052* (2013.01); *H01R 23/7068* (2013.01)

(58) Field of Classification Search
CPC ........... H01R 23/7005; H01R 23/7068; H05K 7/1418; G06K 7/0052; G06K 7/0056
USPC .................................................. 439/377, 630
See application file for complete search history.

(56) References Cited

U.S. PATENT DOCUMENTS

| | | | | |
|---|---|---|---|---|
| 2009/0163081 A1* | 6/2009 | Zhang | ..................... | H01R 27/00 439/630 |
| 2009/0275239 A1* | 11/2009 | Zhang | ................ | H01R 12/7005 439/630 |
| 2011/0092087 A1* | 4/2011 | Jung | .................. | H01R 12/7005 439/159 |

FOREIGN PATENT DOCUMENTS

| KR | 10-2006-0012302 A | 2/2006 |
|---|---|---|
| KR | 10-2006-0026490 A | 3/2006 |

* cited by examiner

*Primary Examiner* — Khiem Nguyen
(74) *Attorney, Agent, or Firm* — Jefferson IP Law, LLP

(57) ABSTRACT

A socket coupled to an electronic device is provided. The socket includes a socket housing having a card containing space, a first tension rib, protruding in a direction of the card containing space in the socket housing, for supporting a first card contained in the card containing space, and a second tension rib, protruding in the direction of the card containing space in the socket housing, for supporting a second card having a size different from that of the first card contained in the card containing space. Accordingly, the electronic device may effectively utilize a space and may be slimmed down.

17 Claims, 12 Drawing Sheets

SOCKET FOR CARD

CROSS-REFERENCE TO RELATED APPLICATION(S)

This application claims the benefit under 35 U.S.C. §119(a) of a Korean patent application filed on May 23, 2013 in the Korean Intellectual Property Office and assigned Serial No. 10-2013-0058483, the entire disclosure of which is hereby incorporated by reference.

TECHNICAL FIELD

The present disclosure relates to a card socket for cards applied to an electronic device.

BACKGROUND

The development of electronic devices has recently applied to various fields closely related to everyday lives. In particular, among the electronic devices, a mobile terminal has essentially become an effective necessity. A processing speed of the mobile terminal has been rapidly increased, and a smart phone with various additional enhanced functions such as web surfing or the like is used by most people. Accordingly, it is expected that nearly every person will own at least one mobile terminal in their lifetime.

Such electronic devices are launched in various sizes according to functions thereof and users' preferences. Therefore, despite having almost the same functions as devices of other vendors, the electronic devices have gradually become smaller, lighter, thinner, and simpler to use, and an electronic device which is slimmed down in its entirety is preferred by users.

Meanwhile, since the aforementioned electronic device is gradually being slimmed down and being provided as a multi-functioned device, external devices are introduced which are implemented to be externally detachable from the electronic device according to a user's need and thus are usable optionally by attaching to the electronic device.

The external devices use a memory card capable of extending a storage space of the electronic device and a personal identification card such as a Subscriber Identification Module (SIM) card, which is detachable so that various users can use one electronic device. In general, the external devices are configured in a card type to easily apply to the electronic device which is being slimmed down and to minimize a detach space, and have been used in such a manner that additional slots are formed in proper positions of an exterior of the electronic device. Thus, the aforementioned cards are selectively inserted and electrically connected to the electronic device. Accordingly, in order to slim down the electronic device, it is necessary to effectively utilize a space for attaching card-type external devices having various sizes.

Thus, there exists a need for an improved card socket for application to an electronic device.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a card socket applied to an electronic device.

Another aspect of the present disclosure is to provide a card socket for containing different-sized cards in the same space and thus for minimizing a containing space thereof.

Another aspect of the present disclosure is to provide a card socket for preventing an attached card from being detached unintentionally.

Another aspect of the present disclosure is to provide a card socket that assists in reducing a size of an electronic device by allowing for different-sized cards to be applied to one socket.

In accordance with an aspect of the present disclosure, a socket is provided. The socket includes a socket housing having a card containing space, a first tension rib, protruding in a direction of the card containing space in the socket housing, for supporting a first card contained in the card containing space, and a second tension rib, protruding in the direction of the card containing space in the socket housing, for supporting a second card having a size different from that of the first card contained in the card containing space.

In an embodiment of the present disclosure, the first tension rib and the second tension rib may be disposed towards an upper surface of the socket housing to maintain a tension in the direction of the card containing space.

In addition, the first tension rib and the second tension rib may be formed integrally with the socket housing.

In addition, the second tension rib may form a first card containing space for guiding the first card.

In addition, the first tension rib for supporting the first card may be disposed in the first card containing space.

In addition, the socket housing may further include a guide groove or a guide protrusion for guiding the first card into the card containing space.

In addition, the second card may be greater in size than the first card.

In addition, the first card and the second card may be any one of a Subscriber Identification Module (SIM) card, a Universal Integrated Circuit Card (UICC) card, and a multimedia card.

In accordance with another aspect of the present disclosure, an electronic device is provided. The electronic device includes a socket disposed in the electronic device, wherein the socket includes a socket housing having a card containing space, a first tension rib, protruding in a direction of the card containing space in the socket housing, for supporting a first card contained in the card containing space, and a second tension rib, protruding in the direction of the card containing space in the socket housing, for supporting a second card having a size different from that of the first card contained in the card containing space.

In accordance with another aspect of the present disclosure, an electronic device is provided. The electronic device includes a board, and a socket mounted on the board, wherein the socket includes a socket housing having a card containing space for containing a second card, a second tension rib, protruding in a direction of the card containing space in the socket housing, for supporting a second card contained in the card containing space, and a first tension rib, protruding in the direction of the card containing space in the socket housing, for operating in an operation space formed by the second tension rib and for supporting a first card smaller in size than the second card.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the following description of the present disclosure, a socket coupled to an electronic device can be applied to various devices, such as, a Personal Digital Assistant (PDA), a laptop computer, a smart phone, a netbook, a Mobile Internet Device (MID), an Ultra Mobile Personal Computer (UMPC), a tablet Personal Computer (PC), a navigator, a Motion Picture Experts Group Layer 3 (MP3) player, etc. In addition, as a card-type external device applied to the socket, various cards can be applied such as a Subscriber Identification Module (SIM) card, a memory card, a Universal Integrated Circuit Card (UICC) card, a multimedia card, etc.

Hereinafter, a first card C1 and a second card C2 can be distinguished as different heterogeneous cards.

Figure 1:
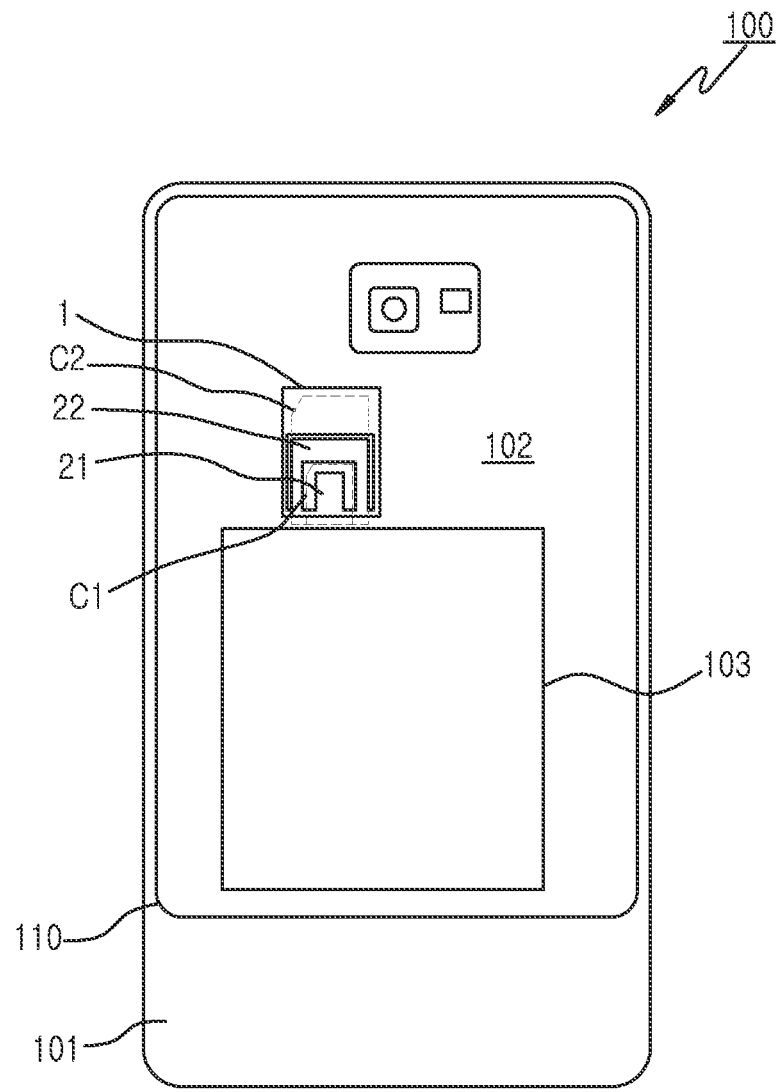
FIG. 1 illustrates a state in which different-sized cards are coupled to a socket according to various embodiments of the present disclosure.

FIG. 1 illustrates a state in which different-sized cards are coupled to a socket according to various embodiments of the present disclosure. Although it is illustrated herein that two cards having different sizes are coupled to the socket, this is only to illustrate that the two cards can be both coupled to one socket. According to the present disclosure, it is preferable that any one of the two cards is selectively contained in or otherwise coupled to the socket.

Referring to FIG. 1, a battery pack 103 can be coupled to a rear surface 101 of an electronic device 100, and a socket 1 may be coupled to an upper portion thereof. As will be described in more detail below, the socket 1 has a card containing space and may contain different cards, i.e., a first card C1 and a second card C2, in the same containing space. The electronic device 100 may include a battery cover 110, which covers the socket 1 and the battery pack 103 and which constitutes an exterior of the electronic device 100. The battery cover 110 may be coupled to a battery attachment surface 102 of the electronic device 100.

According to various embodiments, the socket 1 may include a first tension rib 21 and a second tension rib 22 which are disposed to maintain a tension in a direction of the card containing space in an upper surface of the socket 1. The first card C1 is guided by a guide sidewall of the second tension rib 22, and may be disposed in a space formed by the second tension rib 22. In this case, the first card C1 is pressingly supported by the first tension rib 21, so as not to be pushed backward. Alternatively, the first card C1 may be removed from the socket 1, and the second card C2 may be disposed in the card containing space of the socket 1. In this case, the second card C2 may be pressingly supported by the first tension rib 21 and the second tension rib 22.

Figure 2:
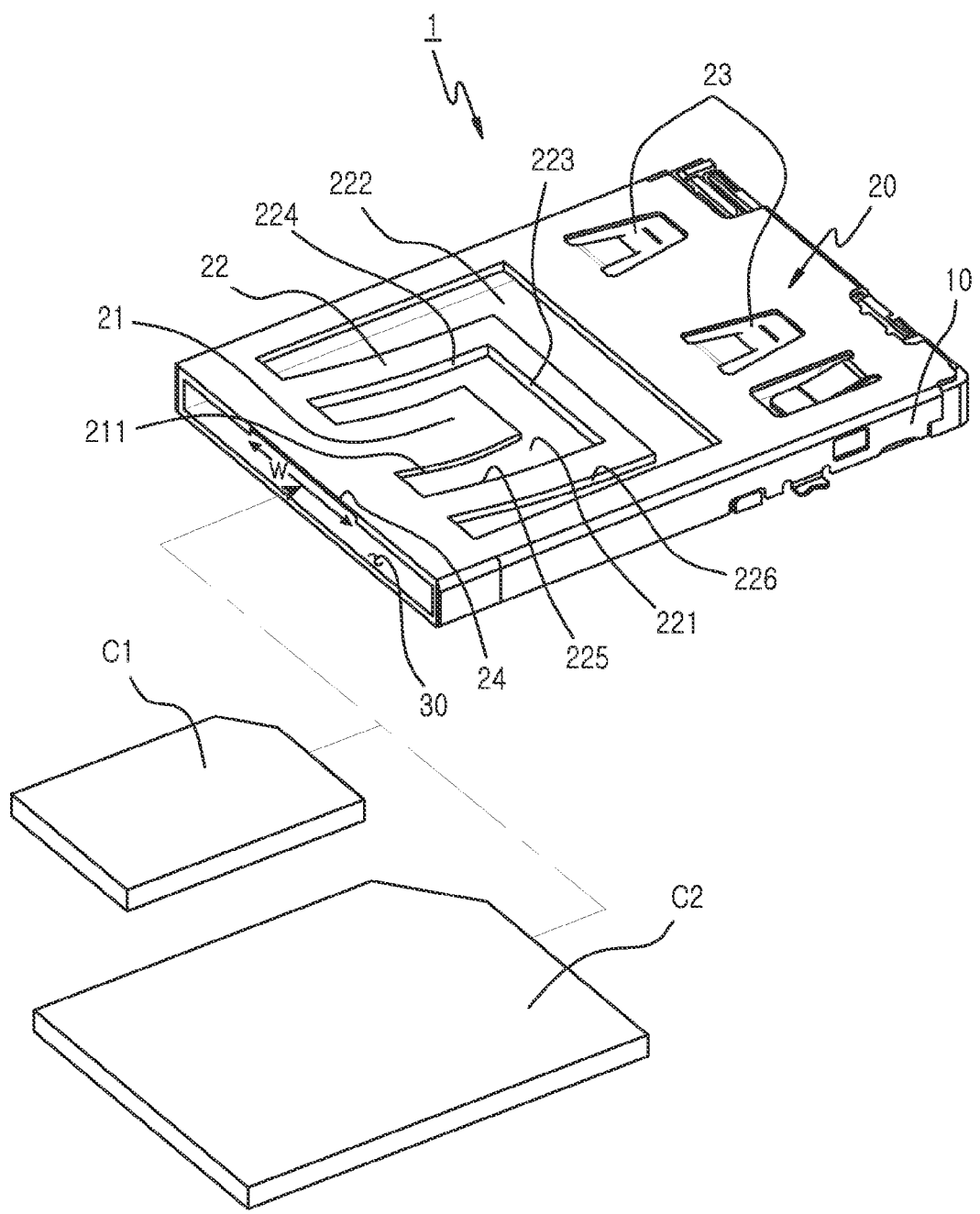
FIG. 2 is a perspective view of a socket according to an embodiment of the present disclosure.

FIG. 2 is a perspective view of a socket according to an embodiment of the present disclosure.

Referring to FIG. 2, a socket 1 may include a socket housing 10 having a card containing space 30 and including a plurality of protrusion nodes disposed inside the card containing space 30 and a socket cover 20 coupled to an upper portion of the socket housing 10 and pressingly supporting an upper portion of a coupled card. According to an embodiment, the socket 1 is disposed in a proper location inside the electronic device 100, and may be mounted on a board (i.e., a Printed Circuit Board (PCB)) in a Surface Mounted Device (SMD) manner. According to an embodiment, the socket 1 may be disposed in a proper location in the electronic device 100, not on the board. According to an embodiment, the socket 1 may be coupled to a case frame of the electronic device 100, and may be disposed in a location corresponding to a slot having a specific length for inserting the card.

The socket housing 10 may be formed of a synthetic resin material, such as by a molding process, and the socket cover 20 may be fixed to the socket housing 10, for example by using insert molding. The socket cover 20 may be formed with a metal plate, and may be installed in such a manner that a card coupled to the socket housing 10 is completely or partially covered. The socket cover 20 may be disposed to maintain a tension in a direction of the card containing space, and may include a first tension rib 21 and a second tension rib 22 to pressingly support the coupled card. In addition, an upper portion of the socket cover 20 may include one or more auxiliary tension ribs 23 protruding towards the card containing space 30 and pressingly supporting the coupled card together with the first tension rib 21 and the second tension rib 22.

The first tension rib 21 may be extended in a lengthwise direction in an upper surface of the socket cover 20, and may be disposed to maintain a tension in a direction of the card containing space. The first tension rib 21 may include a sidewall 211 on an outer peripheral edge thereof. The first tension rib 21 may be separated by a specific interval from the second tension rib 22, and may be disposed in a first space 221 formed by the second tension rib 22. If a first card C1 is inserted, the first space 221 may be applied as a space in which the first card C1 may move upward by pushing up the first tension rib 21. The second tension rib 22 may be disposed in the card containing space 30 in the upper surface of the socket cover 20 to maintain a tension, and may be formed in an open box or a staple shape (e.g., '⊂').

The second tension rib 22 may include a first guide sidewall 224 extended from the socket cover 20 to the card containing space 30, a second guide sidewall 225 facing the first guide sidewall 224, a hindrance portion 223 connecting the first guide sidewall 224 and the second guide sidewall 225, and a third sidewall 226 on an outer peripheral edge thereof. Herein, the first guide sidewall 224 may be separated from the second guide sidewall 225 by a width w of the first card C1. The hindrance portion 223 may be formed with a specific thickness, and may hinder the first C1 from crossing the hindrance portion 223. In addition, if a second card C2 is inserted, the second tension rib 22 may move upward through a second space 222 towards the upper surface of the socket cover 20 by the insertion of the second card C2.

According to the present disclosure, a guide groove 24 may be further formed in the socket housing 10 in a portion where the card containing space 30 begins. The guide groove 24 may assist in properly guiding insertion of the first card C1 having a size less than a width of the card containing space 30. The first card C1 may also be guided by the guide sidewalls 224 and 225 of the second tension rib 22 protruding from the socket cover 20 in a direction of the card containing space, and may be disposed towards the first space 221 by being hindered by the hindrance portion 223 to avoid an excessive insertion. If the first card C1 pushes up the first tension rib 21, the first tension rib 21 presses down the upper surface of the coupled first card C1 at a specific tension, and thus may prevent the first card C1 from being detached from the socket housing 10.

According to an embodiment, the second card C2 may have a size corresponding to a size of the card containing space 30 of the socket housing 10. In this case, the second card C2 may be correctly inserted into the card containing space 30 without an additional guide means. The second card C2 pushes up the first tension rib 21 and second tension rib 22 protruding towards the card containing space 30 simultaneously from the socket cover 20, and is supported by a tension in a downward direction of the first tension rib 21 and the second tension rib 22, thereby being able to prevent the second card C2 from being detached from the socket housing 10.

In general, even if the cards C1 and C2 to be coupled to the socket 1 are fully coupled to the socket 1, the cards may be partially exposed to the outside rather than being fully inserted into the socket housing 10. This is to allow a user to be able to easily separate the cards C1 and C2. Therefore, the cards C1 and C2 may be detached or removed from the card containing space 30 when an exposed portion of the cards C1 and C2 is pulled with a specific tension in a state where the cards C1 and C2 are fully coupled to the socket housing 10.

According to various embodiments, the socket 1 may be formed integrally rather than in a structure in which the socket housing 10 and the socket cover 20 are separated. In this case, the socket 1 is preferably formed with a metal material, and may be formed together with the first tension rib 21 and the second tension rib 22 through a process such as pressing, etc.

FIGS. 3A to 3D illustrate a state of applying a first card to a socket according to an embodiment of the present disclosure.

Figure 3A:
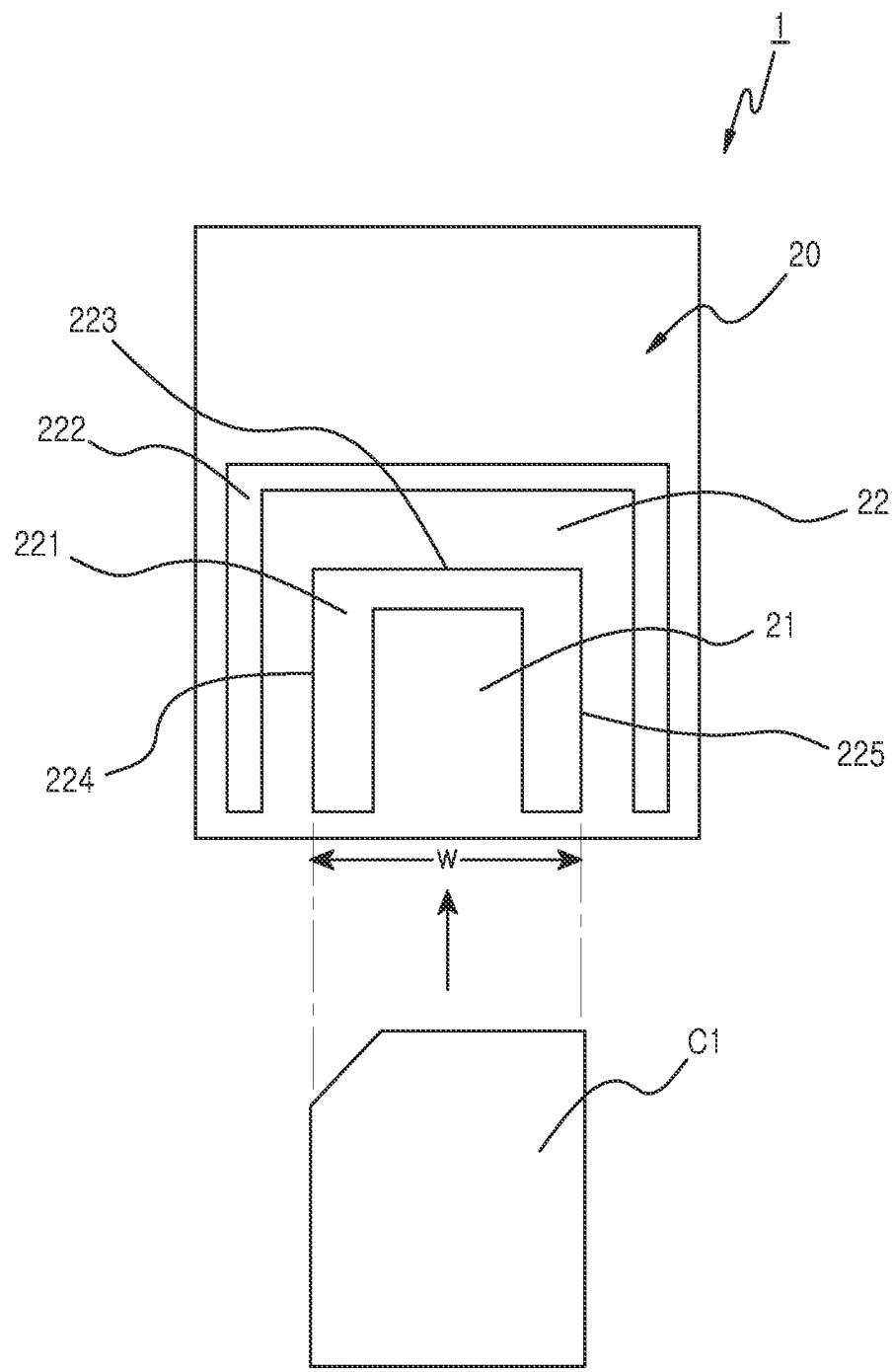
FIGS. 3A, 3B, 3C, and 3D illustrate a state of applying a first card to a socket according to an embodiment of the present disclosure.
Figure 3B:
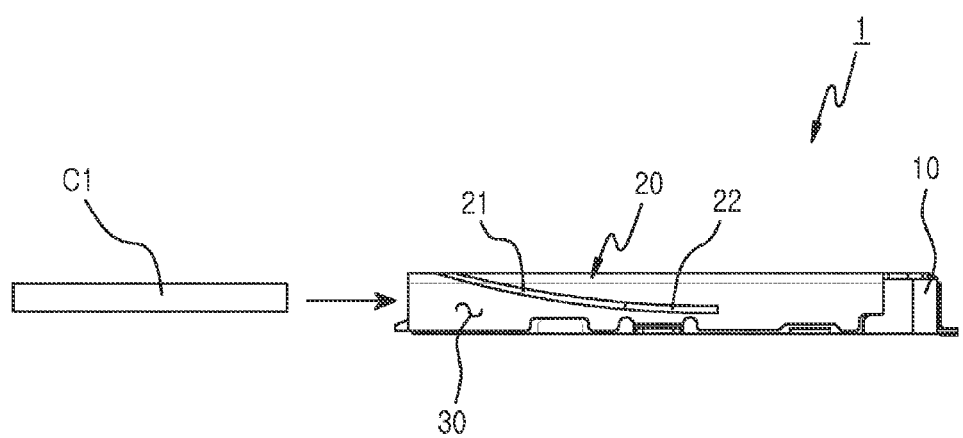

Referring to FIGS. 3A and 3B, a first tension rib 21 may be extended in a lengthwise direction in an upper surface of a socket cover 20, and may be disposed to maintain a tension in a direction of the card containing space. The first tension rib 21 may be separated by a specific interval from a second tension rib 22, and may be disposed towards a first space 221 formed by the second tension rib 22. If a first card C1 is inserted, the first space 221 may be applied as a space in which the first card C1 may move upward by pushing up the first tension rib 21.

The second tension rib 22 may be disposed towards a card containing space 30 in the upper surface of the socket cover 20 to maintain a tension, and may be formed in an open box or a staple shape (e.g., '⊂'). The second tension rib 22 may include a first guide sidewall 224 extended from the socket cover 20 towards the card containing space 30, a second guide sidewall 225 facing the first guide sidewall 224, and a hindrance portion 223 connecting the first guide sidewall 224 and the second guide sidewall 225. Herein, the first guide sidewall 224 may be separated from the second guide sidewall 225 by a width w of the first card C1. The hindrance portion 223 may be formed with a specific thickness, and may hinder the first C1 from crossing the hindrance portion 223. In addition, if a second card C2 is inserted, the second tension rib 22 may move upward through a second space 222 towards the upper surface of the socket cover 20 by the insertion of the second card C2.

According to the present disclosure, a guide groove 24 may be further formed to the socket housing 10 in a portion where the card containing space 30 begins. The guide groove 24 may assist in properly guiding insertion of the first card C1 having a size less than a width of the card containing space 30. The first card C1 may also be guided by the guide sidewalls 224 and 225 of the second tension rib 22 protruding from the socket cover 20 in a direction of the card containing space, and may be disposed towards the first space 221 by being hindered by the hindrance portion 223 to avoid an excessive insertion. If the first card C1 pushes up the first tension rib 21, the first tension rib 21 presses down the upper surface of the coupled first card C1 at a specific tension, and thus may prevent the first card C1 from being detached from the socket housing 10.

According to the present disclosure, the first tension rib 21 and the second tension rib 22 may be disposed to maintain a tension in a direction of the card containing space in the upper surface of the socket cover 20. The second tension rib 22 may form the first space 221 to guide the first card C1, and the first tension rib 21 may be disposed towards the first space 221 to support the first card C1. For example, the first tension rib 21 and the second tension rib 22 may be formed integrally with the socket housing 10, and the first card C1 and the second card C2 may be any one of a SIM card, a memory card, a UICC card, and a multimedia card.

Figure 3C:
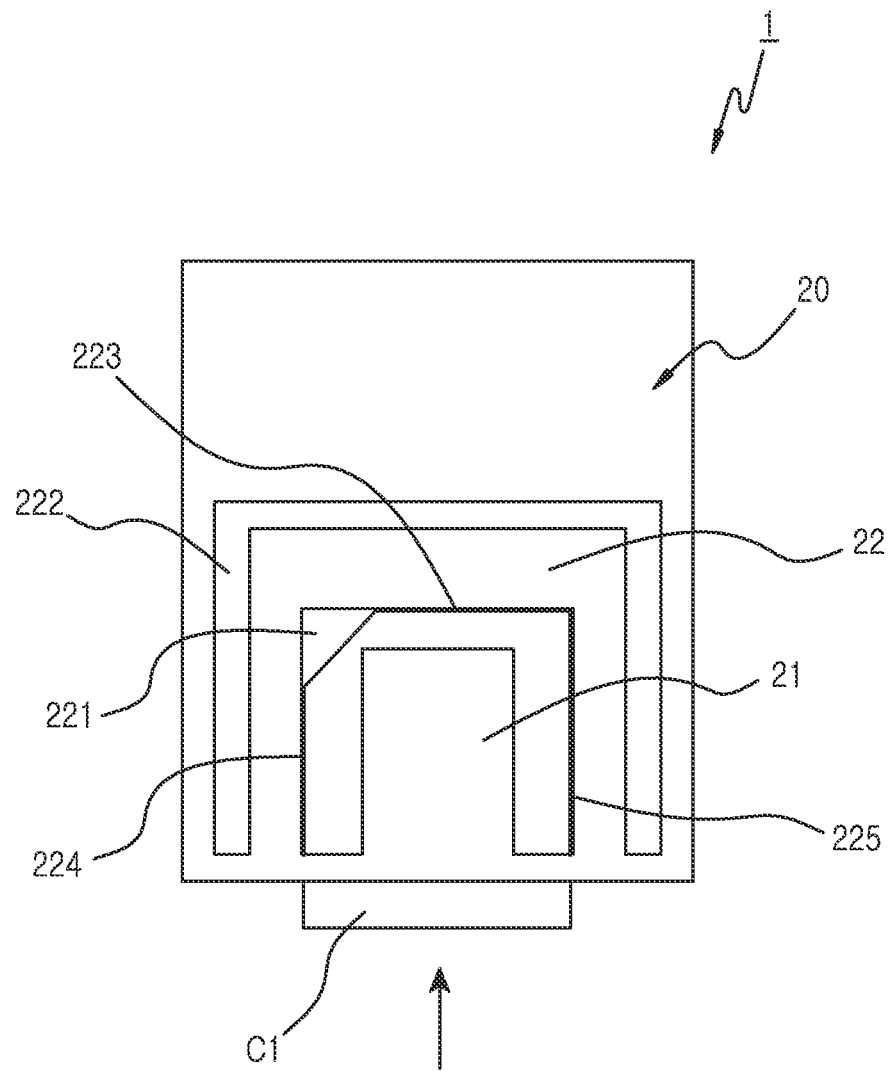
Figure 3D:
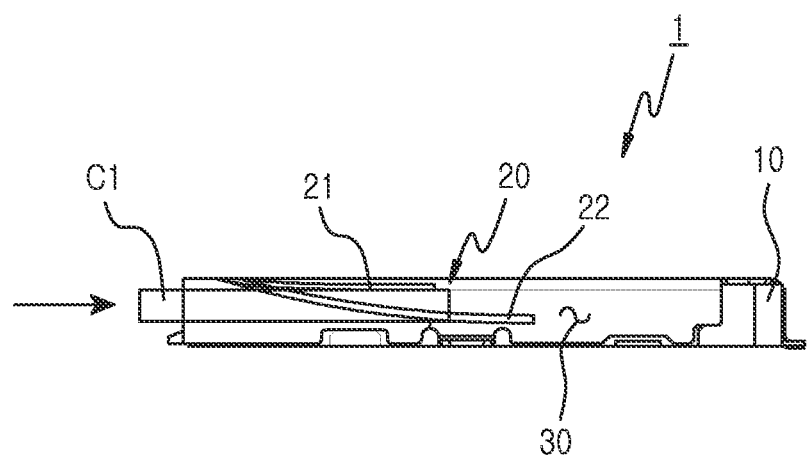

Referring to FIGS. 3C and 3D, a user may push and insert the first card C1 into the card containing space 30 of the socket housing 10 in an arrow direction in the socket 1 coupled to the electronic device 100. A guide groove 24 may be further formed to the socket housing 10 in a portion where the card containing space 30 starts. The guide groove 24 may assist in properly guiding insertion of the first card C1 having a size less than a width of the card containing space 30. The first card C1 may also be guided by the guide sidewalls 224 and 225 of the second tension rib 22 protruding from the socket cover 20 in a direction of the card containing space, and may be disposed towards the first space 221 by being hindered by the hindrance portion 223 to avoid an excessive insertion. In addition, as shown in FIG. 3D, if the first card C1 pushes up the first tension rib 21, the first tension rib 21 presses down the upper surface of the coupled first card C1 at a specific tension, and thus may prevent the first card C1 from being detached from the socket housing 10. In this case, the second tension rib 22 does not move, and one portion of the first card C1 may be exposed through the first space 221.

FIGS. 4A to 4D illustrate a state of applying a second card to a socket according to an embodiment of the present disclosure.

Figure 4A:
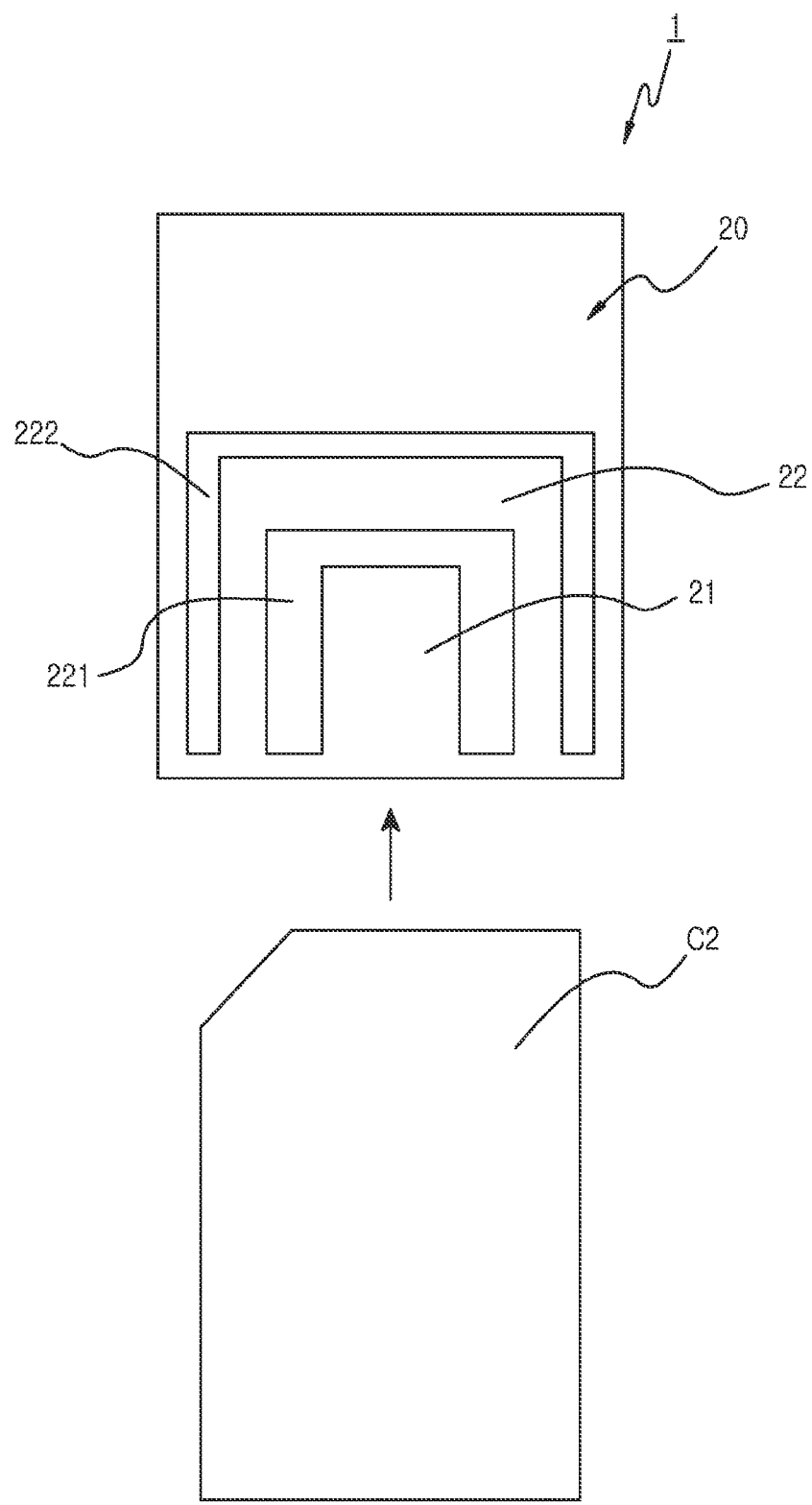
FIGS. 4A, 4B, 4C, and 4D illustrate a state of applying a second card to a socket according to an embodiment of the present disclosure.
Figure 4B:
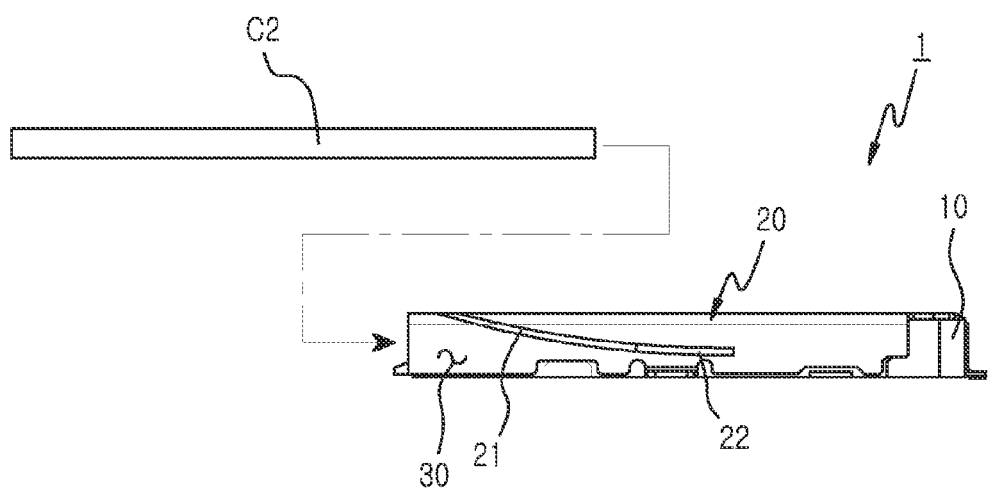

Referring to FIGS. 4A and 4B, a first tension rib 21 may be extended in a lengthwise direction in an upper surface of a socket cover 20, and may be disposed to maintain a tension in a direction of a card containing space. The first tension rib 21 may be separated by a specific interval from a second tension rib 22, and may be disposed in a first space 221 formed by the second tension rib 22. If a first card C1 is inserted, the first space 221 may be applied as a space in which the first card C1 may move upward by pushing up the first tension rib 21.

According to the present disclosure, the second tension rib 22 may be disposed towards a card containing space 30 in the upper surface of the socket cover 20 to maintain a tension, and may be formed in an open box or a staple shape (e.g., '⊂'). The second tension rib 22 may include a first guide sidewall 224 extended from the socket cover 20 to the card containing space 30, a second guide sidewall 225 facing the first guide sidewall 224, and a hindrance portion 223 connecting the first guide sidewall 224 and the second guide sidewall 225. Herein, the first guide sidewall 224 may be separated from the second guide sidewall 225 by a width w of the first card C1. The hindrance portion 223 may be formed with a specific thickness, and may hinder the first card C1 from crossing the hindrance portion 223. In addition, if the second card C2 is inserted, the second tension rib 22 may move upward through the second space 222 towards the upper surface of the socket cover 20 by the insertion of the second card C2.

According to the present disclosure, the first tension rib 21 and the second tension rib 22 may be disposed to maintain a tension in a direction of the card containing space in the upper surface of the socket cover 20. In addition, the second tension rib 22 may form the first space 221 to guide the first card C1, and the first tension rib 21 may be disposed towards the first space 221 to support the first card C1. For example, the first tension rib 21 and the second tension rib 22 may be formed integrally with the socket housing 10, and the first card C1 and the second card C2 may be any one of a SIM card, a memory card, a UICC card, and a multimedia card.

Figure 4C:
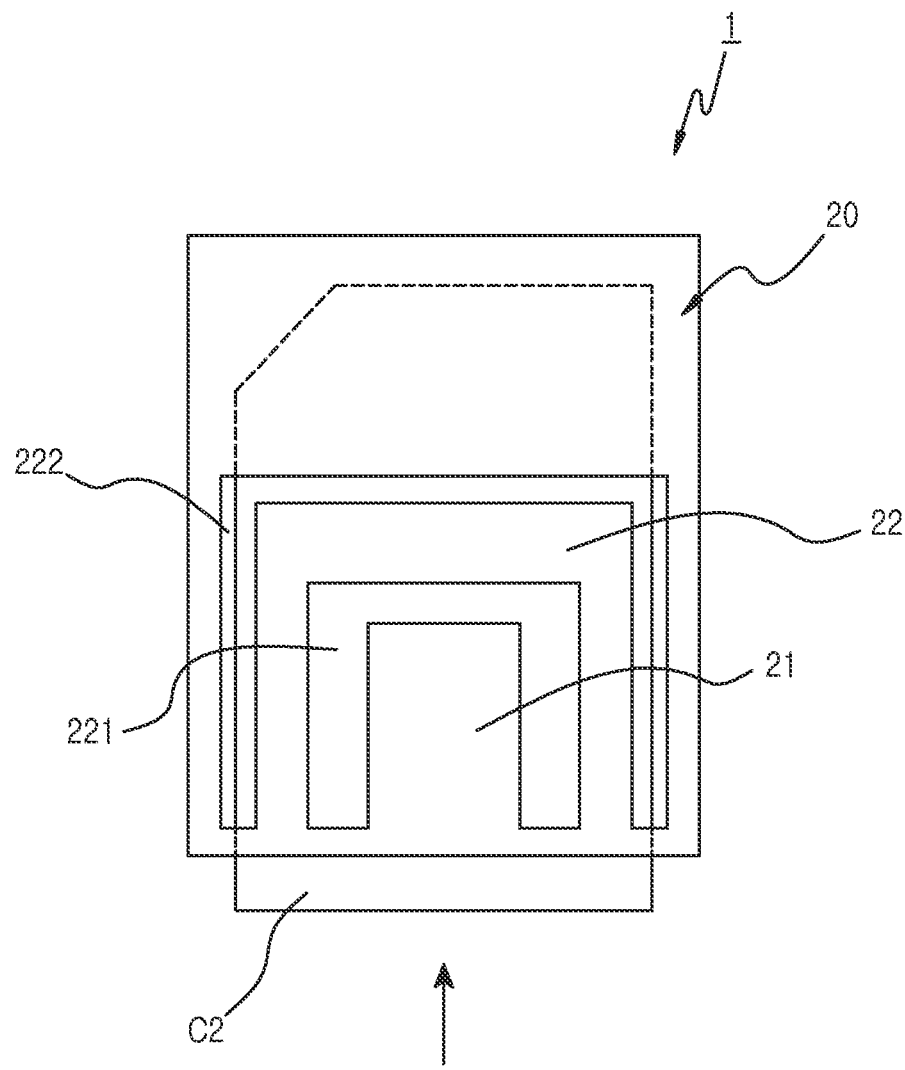
Figure 4D:
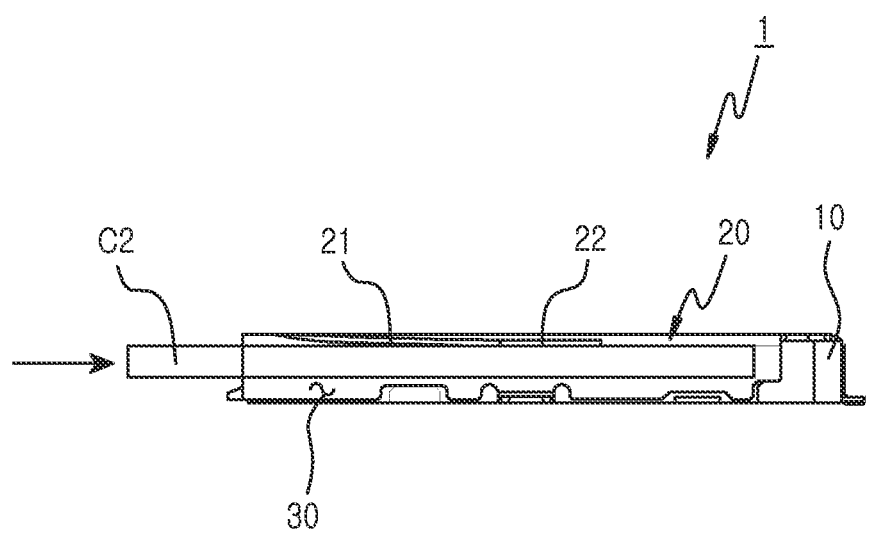

Referring to FIGS. 4C and 4D, a user may push and insert the second card C2 into the card containing space 30 of the socket housing 10 in an arrow direction in the socket 1 coupled to the electronic device 100. The second card C2 may have a size corresponding to a size of the card containing space 30 of the socket housing 10. In this case, the second card C2 may be correctly inserted into the card containing space 30 without an additional guide means. The second card C2 pushes up the first tension rib 21 and second tension rib 22 protruding towards the card containing space 30 simultaneously from the socket cover 20, and is supported by a tension in a downward direction of the first tension rib 21 and the second tension rib 22, thereby being able to prevent the second card C2 from being detached from the socket housing 10.

Figure 5:
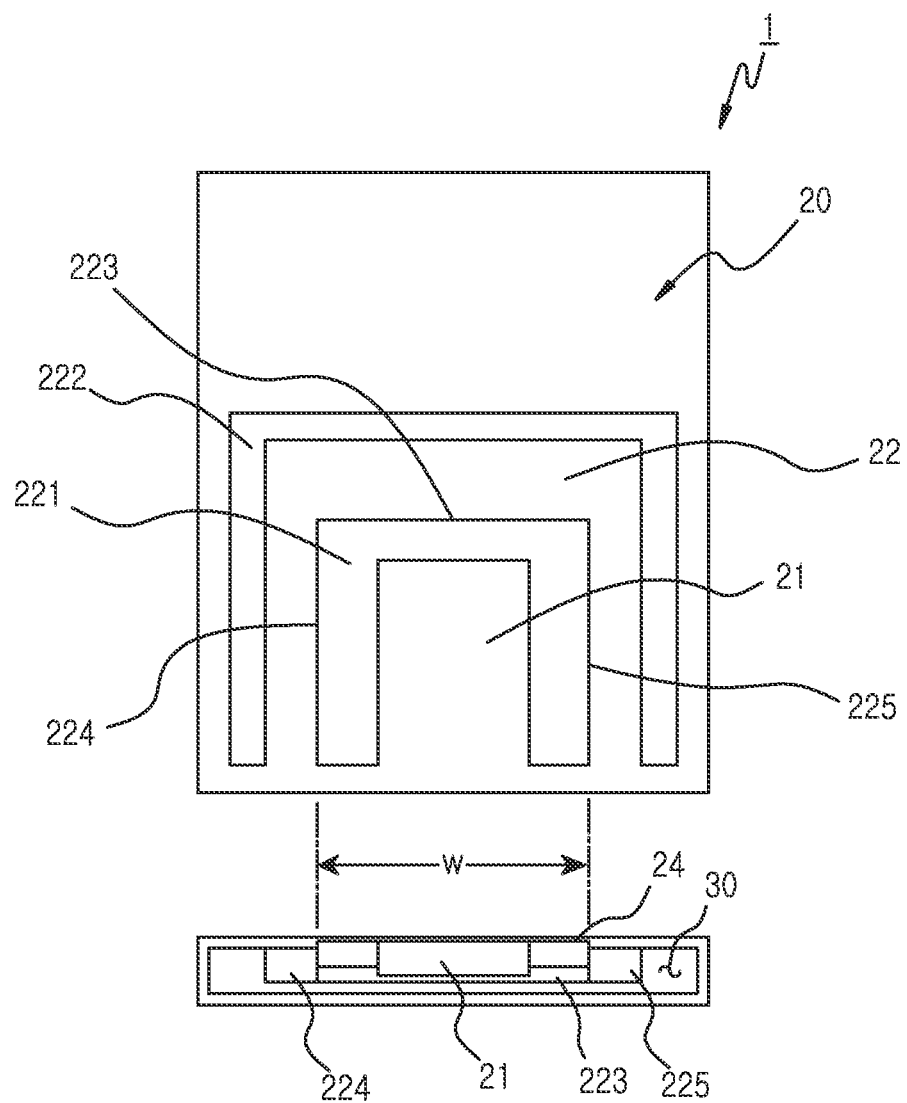
FIG. 5 illustrates a socket according to various embodiments of the present disclosure.

FIG. 5 illustrates a socket according to various embodiments of the present disclosure.

Referring to FIG. 5, a first tension rib 21 and a second tension rib 22 of a socket 1 may be disposed to maintain a tension in a direction of a card containing space in an upper surface of a socket cover 20. In addition, the second tension rib 22 may be lower than the first tension rib 21, so that the second tension rib 22 may easily guide a first card C1. A first guide sidewall 224 and a second guide sidewall 225 of the second tension rib 22 may be separated by a width w of the first card C1 to take a role of guiding the first card C1, and a hindrance portion 223 of the second tension rib 22 may prevent an excessive insertion of the first card C1. A guide groove 24 may be further coupled to one side of the socket cover 20. The guide groove 24 may assist in properly guiding insertion of the first card C1 having a size less than a width of a card containing space 30.

Figure 6:
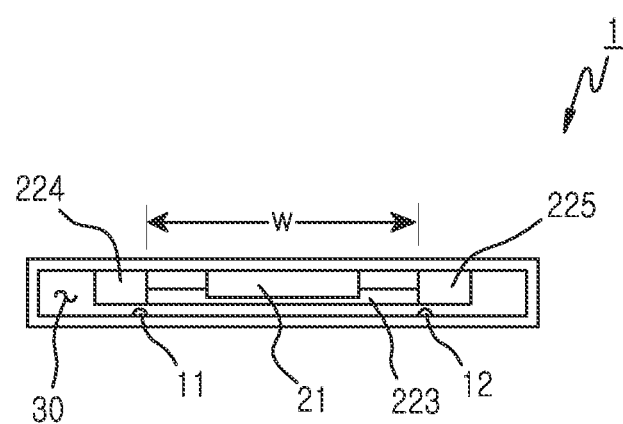
FIG. 6 illustrates a socket according to various embodiments of the present disclosure.

FIG. 6 illustrates a socket according to various embodiments of the present disclosure.

Referring to FIG. 6 together with FIG. 5, a first tension rib 21 and a second tension rib 22 of a socket 1 may be disposed to maintain a tension in a direction of a card containing space in an upper surface of a socket cover 20. In addition, the second tension rib 22 may be lower than the first tension rib 21, so that the second tension rib 22 may easily guide a first card C1. A first guide sidewall 224 and a second guide sidewall 225 of the second tension rib 22 may be separated by a width w of the first card C1 to take a role of guiding the first card C1, and a hindrance portion 223 of the second tension rib 22 may prevent an excessive insertion of the first card C1. Guide protrusions 11 and 12 separated by the width w of the first card C1 may be further coupled to or formed inside a socket housing 10. The guide protrusions 11 and 12 may take a role of guiding the first card C1.

According to various embodiments of the present disclosure, different-sized cards are contained in one socket to minimize a containing space thereof, and a coupled card is prevented from being detached arbitrarily, thereby improving convenience of use and contributing to slim down an electronic device.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:
1. A socket comprising:
   a socket housing having a card containing space;
   a first tension rib, protruding in a direction of the card containing space in the socket housing, for supporting a first card contained in the card containing space; and
   a second tension rib, protruding in the direction of the card containing space in the socket housing, for supporting a second card having a size different from that of the first card contained in the card containing space,
   wherein the first tension rib and the second tension rib are disposed towards an upper surface of the socket housing to maintain a tension in the direction of the card containing space, and
   wherein the first tension rib is operated in an operation space formed by the second tension rib.
2. The socket of claim 1, wherein the first tension rib and the second tension rib are formed integrally with the socket housing.
3. The socket of claim 1, wherein the second tension rib forms a first card containing space for guiding the first card.

4. The socket of claim 3, wherein the first tension rib for supporting the first card is disposed in the first card containing space.

5. The socket of claim 1, wherein the socket housing further comprises at least one of a guide groove and a guide protrusion for guiding the first card into the card containing space.

6. The socket of claim 1, wherein at least one of a width and a length of the second card is respectively greater than a width and a length of the first card.

7. The socket of claim 1, wherein the first card and the second card are any of a Subscriber Identification Module (SIM) card, a Universal Integrated Circuit Card (UICC) card, and a multimedia card.

8. The socket of claim 1, further comprising one or more auxiliary tension ribs protruding towards the card containing space.

9. An electronic device comprising a socket disposed in the electronic device, wherein the socket comprises:
a socket housing having a card containing space;
a first tension rib, protruding in a direction of the card containing space in the socket housing, for supporting a first card contained in the card containing space; and
a second tension rib, protruding in the direction of the card containing space in the socket housing, for supporting a second card having a size different from that of the first card contained in the card containing space,
wherein the first tension rib and the second tension rib are disposed towards an upper surface of the socket housing to maintain a tension in the direction of the card containing space, and
wherein the first tension rib is operated in an operation space formed by the second tension rib.

10. The electronic device of claim 9, wherein the first tension rib and the second tension rib are formed integrally with the socket housing.

11. The electronic device of claim 9, wherein the second tension rib forms a first card containing space for guiding the first card.

12. The electronic device of claim 11, wherein the first tension rib for supporting the first card is disposed in the first card containing space.

13. The electronic device of claim 9, wherein the socket housing further comprises at least one of a guide groove and a guide protrusion for guiding the first card into the card containing space.

14. The electronic device of claim 9, wherein at least one of a width and a length of the second card is respectively greater than a width and a length of the first card.

15. The electronic device of claim 9, wherein the first card and the second card are any one of a Subscriber Identification Module (SIM) card, a Universal Integrated Circuit Card (UICC) card, and a multimedia card.

16. The electronic device of claim 9, further comprising one or more auxiliary tension ribs protruding towards the card containing space.

17. An electronic device comprising:
a board; and
a socket mounted on the board,
wherein the socket comprises:
a socket housing having a card containing space for containing a second card;
a second tension rib, protruding in a direction of the card containing space in the socket housing, for supporting a second card contained in the card containing space; and
a first tension rib, protruding in the direction of the card containing space in the socket housing, for operating in an operation space formed by the second tension rib and for supporting a first card smaller in size than the second card.

* * * * *